US00RE43689E

(19) United States
(12) Reissued Patent
Pohja et al.

(10) Patent Number: US RE43,689 E
(45) Date of Reissued Patent: Sep. 25, 2012

(54) SYSTEM AND METHOD FOR REGISTERING ATTENDANCE OF ENTITIES ASSOCIATED WITH CONTENT CREATION

(75) Inventors: Seppo Pohja, Hyvinkaa (FI); Jari Mononen, Ruutana (FI)

(73) Assignee: Nokia Corporation, Espoo (FI)

(21) Appl. No.: 12/777,970

(22) Filed: May 11, 2010

Related U.S. Patent Documents

Reissue of:
(64) Patent No.: 7,373,109
Issued: May 13, 2008
Appl. No.: 10/701,158
Filed: Nov. 4, 2003

(51) Int. Cl.
*H04B 7/00* (2006.01)

(52) U.S. Cl. ..... 455/41.2; 455/41.1; 455/552.1; 455/553.1; 455/556.1; 455/557; 455/456.1; 455/456.3; 455/456.5; 455/456.6; 455/466; 340/572.1; 340/539.1; 340/539.11; 340/539.13; 348/231.6

(58) Field of Classification Search ..... 455/550.1, 455/41.1–41.2, 556.1–556.2, 90.1–90.3, 455/418–420, 414.1–414.4, 415, 557, 456.1–456.6, 455/457, 466, 552.1, 553.1; 340/572.1, 573.1, 340/539.1, 539.11, 539.13, 539.15, 686.1, 340/686.6; 707/E17.026; 348/231.99, 231.2–231.6, 348/207.99, 207.1, 14.01–14.04, 61
See application file for complete search history.

(56) References Cited

U.S. PATENT DOCUMENTS 5,415,167 A 5/1995 Wilk
5,426,594 A 6/1995 Wright et al.
5,463,696 A 10/1995 Beernink et al.
5,478,989 A 12/1995 Shepley
5,499,294 A 3/1996 Friedman
5,508,695 A 4/1996 Nelson et al.
5,513,117 A 4/1996 Small
5,550,535 A 8/1996 Park
5,592,375 A 1/1997 Salmon et al.
5,629,981 A 5/1997 Nerlikar
5,649,296 A 7/1997 MacLellan
5,682,142 A 10/1997 Loosmore et al.
5,740,538 A 4/1998 Joyce et al.
5,771,283 A 6/1998 Chang et al.

(Continued)

FOREIGN PATENT DOCUMENTS

DE 296 13 393 U1 12/1997

(Continued)

OTHER PUBLICATIONS

Supplementary European Search Report for European Application No. 04769564.8 dated May 21, 2012, pp. 1-5.

(Continued)

*Primary Examiner* — Tuan A Tran
(74) *Attorney, Agent, or Firm* — Ditthavong Mori & Steiner, P.C.

(57) ABSTRACT

A system and method for registering or otherwise associating items with generated content. Identification of who and/or what is present in connection with the generation of content is determined. In one embodiment, images, video, audio, or other media/multimedia content is generated, and the items and/or people present and relevant to the creation of that content are determined. A record of those relevant items and/or people may then be associated with that created content, so that the content includes a record of who/what was there when the content was created.

37 Claims, 8 Drawing Sheets

U.S. PATENT DOCUMENTS

| | | | | |
|---|---|---|---|---|
| 5,794,142 | A | 8/1998 | Vanttila et al. | |
| 5,821,513 | A | 10/1998 | O'Hagan et al. | |
| 5,886,646 | A | 3/1999 | Watanabe et al. | |
| 5,949,335 | A | 9/1999 | Maynard | |
| 5,959,530 | A | 9/1999 | Lupien, Jr. et al. | |
| 6,018,774 | A | 1/2000 | Mayle et al. | |
| 6,055,442 | A | 4/2000 | Dietrich | |
| 6,177,860 | B1 | 1/2001 | Cromer et al. | |
| 6,185,426 | B1 | 2/2001 | Alperovich et al. | |
| 6,259,367 | B1 | 7/2001 | Klein | |
| 6,269,446 | B1 | 7/2001 | Schumacher et al. | |
| 6,295,506 | B1 | 9/2001 | Heinonen et al. | |
| 6,370,389 | B1 | 4/2002 | Isomursu et al. | |
| 6,370,568 | B1 | 4/2002 | Garfinkle | |
| 6,400,272 | B1 | 6/2002 | Holtzman et al. | |
| 6,446,208 | B1 | 9/2002 | Gujar et al. | |
| 6,574,604 | B1 | 6/2003 | van Rijn | |
| 6,577,901 | B2 | 6/2003 | Thompson | |
| 6,624,752 | B2 | 9/2003 | Klitsgaard et al. | |
| 6,732,152 | B2 | 5/2004 | Lockhart et al. | |
| 6,795,711 | B1 | 9/2004 | Sivula | |
| 6,804,379 | B2 | 10/2004 | Rhoads | |
| 6,816,725 | B1 | 11/2004 | Lemke et al. | |
| 6,839,022 | B1 | 1/2005 | Benco et al. | |
| 6,868,340 | B2 | 3/2005 | Alexander et al. | |
| 7,149,503 | B2 | 12/2006 | Aarnio et al. | |
| 7,159,503 | B1 * | 1/2007 | Weatherwax | 89/36.04 |
| 2001/0051876 | A1 | 12/2001 | Seigel et al. | |
| 2002/0008622 | A1 * | 1/2002 | Weston et al. | 340/572.1 |
| 2002/0065680 | A1 | 5/2002 | Kojima et al. | |
| 2002/0070862 | A1 | 6/2002 | Francis et al. | |
| 2002/0082001 | A1 | 6/2002 | Tanaka et al. | |
| 2002/0101519 | A1 * | 8/2002 | Myers | 348/232 |
| 2002/0111164 | A1 | 8/2002 | Ritter | |
| 2002/0130178 | A1 | 9/2002 | Wan et al. | |
| 2002/0131565 | A1 | 9/2002 | Scheuring et al. | |
| 2002/0132616 | A1 | 9/2002 | Ross et al. | |
| 2003/0016804 | A1 | 1/2003 | Sheha et al. | |
| 2003/0064685 | A1 | 4/2003 | Kim | |
| 2003/0088496 | A1 | 5/2003 | Piotrowski | |
| 2003/0095032 | A1 * | 5/2003 | Hoshino et al. | 340/5.92 |
| 2003/0114137 | A1 | 6/2003 | Eiden | |
| 2003/0148775 | A1 | 8/2003 | Spriestersbach et al. | |
| 2003/0211856 | A1 | 11/2003 | Zilliacus | |
| 2003/0220835 | A1 | 11/2003 | Barnes | |
| 2003/0227392 | A1 | 12/2003 | Ebert et al. | |
| 2004/0002305 | A1 * | 1/2004 | Byman-Kivivuori et al. | 455/41.2 |
| 2004/0015562 | A1 | 1/2004 | Harper et al. | |
| 2004/0023686 | A1 | 2/2004 | King et al. | |
| 2004/0025035 | A1 | 2/2004 | Jean-Claude et al. | |
| 2004/0075752 | A1 * | 4/2004 | Valleriano et al. | 348/231.3 |
| 2004/0117684 | A1 | 6/2004 | Chamberlain | |
| 2004/0128197 | A1 | 7/2004 | Bam et al. | |
| 2004/0133524 | A1 | 7/2004 | Chamberlain | |
| 2004/0157622 | A1 | 8/2004 | Needham | |
| 2004/0203352 | A1 | 10/2004 | Hall | |
| 2004/0203944 | A1 | 10/2004 | Huomo | |
| 2005/0060299 | A1 | 3/2005 | Filley et al. | |
| 2006/0128408 | A1 | 6/2006 | Perttila | |

FOREIGN PATENT DOCUMENTS

| | | | |
|---|---|---|---|
| DE | 100 42 914 | A1 | 4/2001 |
| EP | 0 801 512 | | 10/1997 |
| WO | WO 97/28736 | | 8/1997 |
| WO | WO 97/46960 | | 12/1997 |
| WO | WO 98/10358 | A1 | 3/1998 |
| WO | WO 99/17230 | | 4/1999 |
| WO | WO 00/74406 | | 12/2000 |
| WO | WO 01/06507 | | 1/2001 |
| WO | WO 01/17297 | | 3/2001 |
| WO | WO 01/20542 | | 3/2001 |
| WO | WO 01/73687 | | 4/2001 |
| WO | WO 01/39103 | | 5/2001 |
| WO | WO 01/39108 | | 5/2001 |
| WO | WO 01/45319 | | 6/2001 |
| WO | WO 01/47291 | | 6/2001 |
| WO | WO 01/99410 | | 12/2001 |
| WO | WO 02/35773 | | 2/2002 |
| WO | WO 03/063106 | * | 7/2003 |

OTHER PUBLICATIONS

Radio Frequency Identification—A basic primer, Version 1.11, Sep. 28, 1999, http://www.aimglobal.org/technologies/rfid/resources/papers/rfid_basics_primer.htm (Printed from internet Jun. 26, 2002).

Want et al., "Bridging Physical and Virtual Worlds with Electronic Tags", Chi 99 Conference Proceedings Human Facotrs in Computing Systems, pp. 370-377, May 15-20, 1999.

* cited by examiner

SYSTEM AND METHOD FOR REGISTERING ATTENDANCE OF ENTITIES ASSOCIATED WITH CONTENT CREATION

Matter enclosed in heavy brackets [ ] appears in the original patent but forms no part of this reissue specification; matter printed in italics indicates the additions made by reissue.

FIELD OF THE INVENTION

This invention relates in general to communications, and more particularly to a system and method for registering attendance of people and/or objects with created content.

BACKGROUND OF THE INVENTION

Advances in communication infrastructures and devices have turned standard communication devices into valuable tools. People communicate with each other, and with other electronic devices, over networks ranging from Local Area Networks (LANs) to wide reaching Global Area Networks (GANs) such as the Internet. Wireless communications devices such as mobile phones, Personal Digital Assistants (PDAs), and the like are often designed to interface with such networks as well as with their local surroundings using short-range wireless technologies.

Today, such wireless devices are being used for a variety of different types of communication, as well as the creation of original content. For example, current and anticipated mobile phone technologies have transformed wireless devices into powerful tools capable of capturing and communicating voice, data, images, video, and other multimedia content. Mobile phones, at one time solely a voice communication tool, now often include digital photographic, video, and audio recording capabilities along with network communication capabilities such as e-mail and World Wide Web browsing.

Digital content, such as still pictures, audio, video and other multimedia, can be captured and transmitted via these communications devices and infrastructures. It is often desirable to visually include a date or time stamp on such content, as it can help the content owner in various ways. More particularly, current cameras utilizing film-based technology often include a date stamp exposed near an edge of the photograph. However, any such information provided relates to the content itself, and does not take into account other related and potentially valuable information.

For example, people may want to know who or what was present when some content was created. Currently, such information is recorded manually. For example, photographs taken by professional photographers are often painstakingly associated with the subjects of the photograph, often by interviewing each subject within the photograph for information such as name, address, and the like. The information may be written on the back of the developed photograph.

With the rapid expansion of systems and devices available for content creation, there is a need for determining and organizing attendance information as it relates to the creation of content. The present invention addresses these and other problems of the prior art, and offers a variety of advantages over the prior art.

SUMMARY OF THE INVENTION

To overcome limitations in the prior art described above, and to overcome other limitations that will become apparent upon reading and understanding the present specification, the present invention discloses a system and method for registering entities associated in some manner with the creation of content. The associated entities are registered with the created content so that it can be determined who and/or what was present when the content was created.

In accordance with one embodiment of the invention, a method is provided for registering entities associated with the creation of content. Content is created, and identifiers corresponding to entities associated with the creation of the content are obtained. The entities associated with the creation of the content may include, for example, mobile device users that are involved in the creation of the content, subjects of the content, affiliated with the creator of the content, etc. The identifiers of such entities are registered with the created content. In this manner, those people or objects associated with the creation of the content can be registered with the content.

In accordance with more particular embodiments of such a method, the obtained identifiers may be filtered to designate certain identifiers of interest, and those particular identifiers are then registered with the content rather than all collected identifiers. For example, a first mobile device user may take a photo of a group of mobile device users that are among a larger crowd of mobile device users. A query for the identifications of the targeted group of mobile device users may result in identifiers being returned from the targeted group as well as other mobile device users in the area. Filtering may be used to extract the identifiers that are not among the targeted group, so that only the identifiers associated with the targeted group of users are registered with the content. Further, the identifiers of this targeted group may be mapped to addresses, such as MSISDNs, e-mail addresses, or the like so that the content and/or the list of identifiers of the targeted group can be sent to the targeted group.

In other embodiments of such a method, the association of the identifiers with the created content may involve including a reference to a list of the identifiers with the content, or alternatively including a reference to the created digital content with the list of the stored identifiers (or both). Such references may be, for example, addresses (e.g., URL), filenames, or the like. In other embodiments, the association of the identifiers with the created content involves providing an external data object including a reference to the created digital content and to the obtained identifiers. In still other embodiments, the association of the identifiers with the created content involves including the created digital content and the obtained identifiers in a common container, such as a file, session, data pipe, stream, etc.

In other particular embodiments of such a method, the created digital content is stored at a terminal such as a mobile phone, PDA, computing device, or the like. In such case, obtaining the identifiers may include transmitting wireless signals from the terminal to the entities that are within a wireless transmission range of the terminal, and receiving responsive wireless signals, including the identifiers, from the entities that are within the wireless transmission range of the terminal. For example, the transmitted and received signals may be Bluetooth signals, RFID signals, signals sent via a WLAN, etc.

In still other particular embodiments of such a method, obtaining the identifiers at a terminal may involve the terminal requesting the identifiers from a network service. In such case, the network service may identify the entities located within a certain geographic area relative to the location of the terminal. The network service may create a list of entities of interest by filtering out the identified entities that are not among a predetermined list of entities of interest, and the list of entities of interest may then be provided to the terminal for registration with the created content. In another embodiment, the entire list of entities located within the geographic area from the network service is provided to the terminal, and the terminal performs any such filtering functions.

In accordance with another embodiment of the invention, a method is provided for registering entities associated with the creation of content. Digital content is created at a mobile device. A query signal(s) is transmitted from the mobile device to entities within a wireless transmission range of the mobile device. The mobile device receives identifiers from the entities in response to the entities successfully receiving the query signal. The received identifiers are digitally associated with the digital content created at the mobile device.

According to more particular embodiments of such a method, the received identifiers include a user identification of devices operated by respective users such as an MSISDN, and/or may include an equipment identification of the devices operated by the respective users. In other particular embodiments, transmitting the query signal includes wirelessly transmitting signals such as Bluetooth query signals, WLAN query signals, RFID signals, etc.

In accordance with another embodiment of the invention, a computer-readable medium is provided having instructions stored thereon that are executable by a mobile device computing system for registering entities associated with the creation of content. The computer-executable instructions perform steps including storing digital content via the mobile device, initiating a collection of entity identifiers corresponding to entities associated with creation of the digital content, receiving the entity identifiers from the entities, and registering the entity identifiers with the created content.

In accordance with another embodiment of the invention, a mobile terminal is provided, which includes a content generation module configured to create digital content. For example, the content generation module may include hardware, software, firmware, or any combination thereof to facilitate creation of digital images, video, audio, or other media/multimedia. The mobile device includes a query signal generation module configured to transmit an attendance query signal. An association module is configured to receive identifiers from entities receiving the attendance query signal, and to associate the received identifiers with the created digital content.

In accordance with another embodiment of the invention, a system is provided for registering entities associated with the creation of content. The system includes one or more mobile devices each having at least one wireless transmission mechanism to communicate its associated identifier in response to a query signal. The system includes a registration module that includes storage to store digital content that is created and that involves the mobile devices. The registration module also includes a query signal generation module configured to transmit the query signal, and an association module configured to receive the identifiers from the one or more first mobile devices that receive the query signal and to associate at least the received identifiers with the created digital content.

According to another embodiment of the invention, a system is provided for registering entities associated with the creation of content where a network service is utilized. One or more first mobile devices are coupled to a network to which the network service is also associated. Each of the first mobile devices includes an identifier. A second mobile device is also coupled to the network and also includes an identifier. The second mobile device generates and stores content that it creates, where the content creation implicates the first mobile devices as well as the second mobile device. The creation of the content may implicate the first mobile devices where, for example, the users of the first mobile are the subject of the creation of the content, or where the first mobile devices (and/or their users) are involved in actually creating the content. The second mobile device transfers a request to the network service to obtain the identifiers of the first and second mobile devices, and receives from the network service a list of the identifiers of the first and second mobile devices. The second mobile device includes a registration module configured to associate the received list of identifiers with the created content.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described particular examples of a system and method in accordance with the invention.

BRIEF DESCRIPTION OF THE DRAWINGS

The invention is described in connection with the embodiments illustrated in the following diagrams.

DETAILED DESCRIPTION OF THE INVENTION

Figure 1:
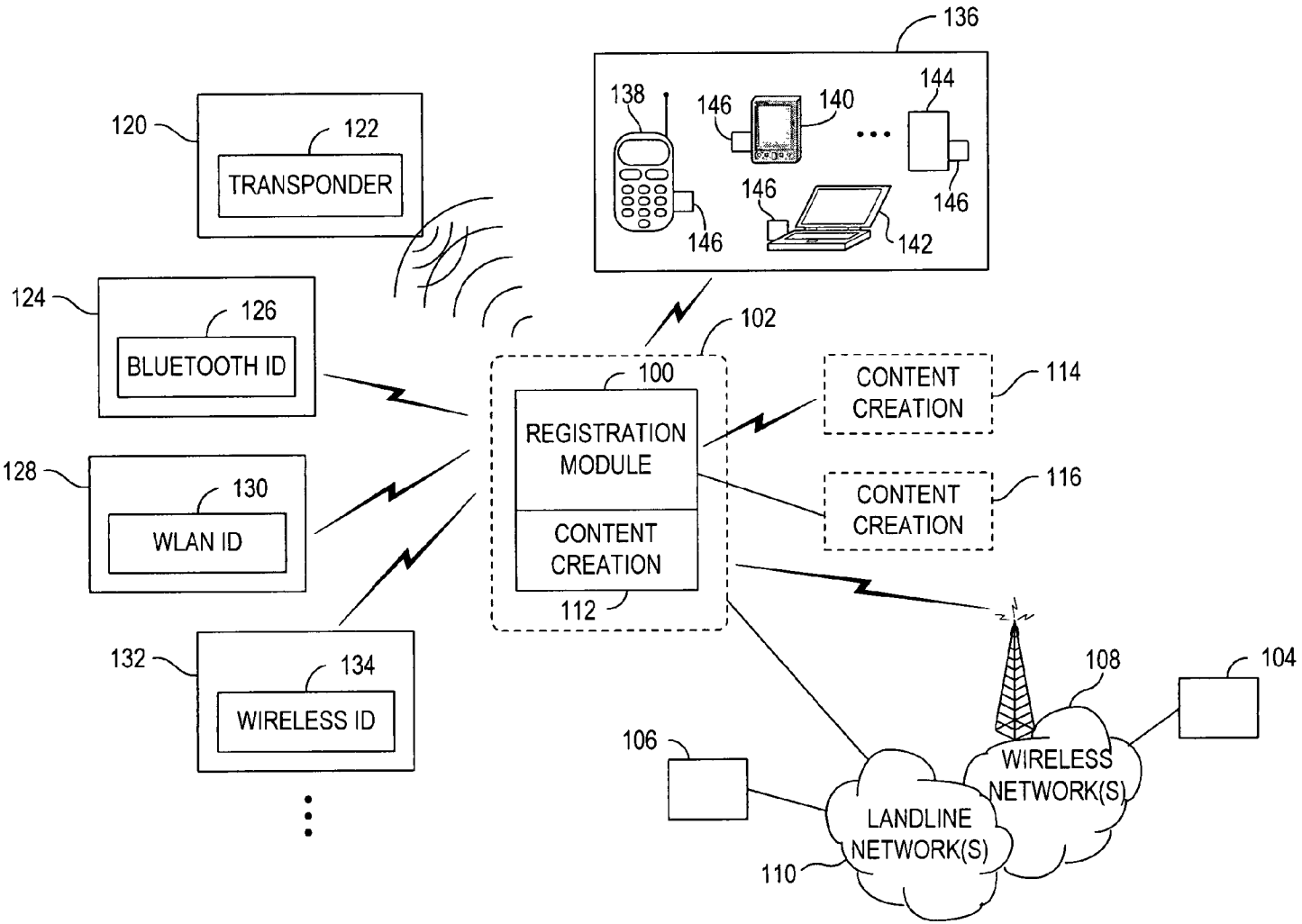
FIG. 1 is a block diagram illustrating representative embodiments for identifying and registering entities associated with the creation of content in accordance with the present invention.

In the following description, reference is made to the accompanying drawings, which form a part hereof, and in which is shown by way of illustration various embodiments in which the invention may be practiced. It is to be understood that other embodiments may be utilized, as structural and operational changes may be made without departing from the scope of the present invention.

Generally, the present disclosure describes a manner for registering or otherwise associating items with generated content. Identification of who and/or what is present in connection with the generation of content is determined. In one embodiment, images, video, audio, or other media/multimedia content is generated, and the items and/or people present and relevant to the creation of that content are determined. A record of those relevant items and/or people may then be associated with that created content, so that the content includes a record of who/what was there when the content was created.

The invention is beneficial for various reasons. For example, people often want to know who was present when a photograph was taken, a video was filmed, etc. It may be desirable to assist in identifying those people/objects that are present in the content, and/or to identify those who cannot be identified directly from the content (e.g., not perceivable, or not physically within the field of view of the photo, video, etc.). Similar needs may occur in making audio recording, or any other form of content. The need or desire may be social, such as to distribute copies to the relevant people. The need or desire may be professional where content is recorded, for example, as part of a scientific study. In some cases, it may also be desirable to know what was there rather than, or in addition to, who was there, such as to record all instruments that are present when a recording is performed. This may be desirable when, for example, a recording is carried out and to identify potential sources of interference. The present invention is applicable in these and many other similar scenarios.

In more particular embodiments of the invention, a software-based module enables registration of information with digital content. Such a module allows information related to the content and/or associations between the content and entities to be registered with the content. Such entities may include, for example, any object, person, system, or other item capable of being associated or otherwise of interest in connection with the content that is created. For example, people and/or users of communication and/or computing devices may be identified as being associated with the generation of content, and those people, users, and/or associated devices may then be registered with the content so that the content includes a list or other identification of who/what was present in connection with the creation of the content.

More particularly, a non-exhaustive, representative list of such entities that may be identified include mobile phones, Personal Digital Assistants (PDAs), networked devices, computers, transmitters, recording instruments, people, etc. In accordance with the invention, such entities may be identified using any type of identifiers that can be provided via wireless or wired technologies such as Radio Frequency Identification (RFID) tags or other transponders, GPS identifiers, cellular identifiers, WLAN identifiers, Bluetooth or other short-range wireless identifiers, or other device IDs. For example, as will be described more fully below, people may be outfitted or otherwise equipped with RFID tags, such as in a name badge, sticker, clothing, etc. People may also be identified by RFID tags, Bluetooth or other short-range wireless IDs, cellular IDs, and the like that is associated with their respective mobile devices. Objects such as instruments, mobile devices, etc., may be similarly identified using RFID tags or other transponders, short-range wireless IDs, WLAN IDs, cellular IDs, GPS, etc. The present invention is applicable using any type of proximity and/or positioning technology, as will be described more fully below.

The present invention is applicable in connection with the capture, creation, storage, and/or recording of any type of content. For example, representative examples of such content includes data, images, video, audio, musical instrument digital interface (MIDI) information, digital artist renderings, photographs, programming code, etc.

It should be noted that while various embodiments of the invention are described herein in terms of software implementations, those skilled in the art will readily appreciate that embodiments of the present invention may be implemented using any combination of hardware, software, or firmware.

FIG. 1 is a block diagram illustrating representative embodiments for identifying and registering entities associated with the creation of content in accordance with the present invention. In the embodiment of FIG. 1, proximity and/or location identifiers such as RFID tags, and identifiers of Bluetooth and WLAN are recorded. A registration module 100 is provided to register or otherwise determine the entities associated with the creation of some content. For example, the registration module 100 may be implemented as a module associated with another device 102, such as a communication or computing device having, for example, a processor, memory/storage, operating system, etc. The registration module 100 may alternatively be a stand-alone device, implemented in hardware, firmware, software, or combination thereof.

For purposes of illustration and not of limitation, the device 102 will be assumed to be a mobile device capable of communicating wirelessly with other devices, and optionally with networks. For example, the device 102 may be a camera-equipped mobile phone, which is capable of communicating with devices 104, 106 via a wireless network(s) 108 (e.g., WLAN, cellular network, etc.), and landline networks 110 (e.g., LAN, Internet, etc.). For example, a mobile device 102 may be configured to communicate wirelessly over cellular networks, and/or may be configured to communicate wirelessly over local wireless networks such as, for example, facilitated by IEEE 802 or similar standards. The mobile (or other) device 102 may also include a wired port(s) such as a serial port, USB port, or other analogous port; network interface; modem; or other manner of communicating via wired connection.

In accordance with one embodiment of the invention, content may be created at the device 102. For example, the device 102 may be a camera-equipped mobile phone, where the user of the device 102 takes a digital photograph, thereby creating a digital image. In such an embodiment, the content creation module 112 represents a camera function. Alternatively, the device 102 may be equipped with different or additional functions, such as a video recorder, audio recorder, and/or the like. Further, the content may actually be created via another device, as represented by the content creation modules 114, 116, where the resulting content is transmitted to the device 102 via wireless or wired connections respectively. For example, content creation module 116 may be a digital camera that is not equipped with a registration module 100. A created image can be downloaded to the device 102, which in turn can perform the registration functions in accordance with the present invention.

For purposes of discussion, it is assumed that the device 102 is a camera-equipped mobile phone, and a picture (i.e., digital image) has been taken by the user of the mobile phone 102. It is often of interest who and/or what was there when such a photo is taken. This may include the people or objects that can be directly identified from the photo, and may also include people and/or objects that were present but not identifiable in the photo or otherwise not within the field of view of the photo. In accordance with the invention, people and/or objects of interest involved or otherwise associated with the content may be identified and registered with the content. According to one embodiment, proximity/location technologies are used to identify the people and/or objects that are present. FIG. 1 illustrates some representative proximity and location identifiers that can be used in connection with the present invention.

For example, devices or objects 120 can be equipped with transponders 122 that use electromagnetic/electrostatic coupling in the radio frequency portion of the electromagnetic spectrum. One such technology is Radio Frequency Identification (RFID). For example, the device 120 may be a person's identification badge, a mobile device, or other device having such a transponder 122. Transponders 122 or "tags" are activated by radio frequency waves emitted by a source device, which is device 102 in the illustrated embodiment. When activated, the tag transmits information to a reader module (not shown) associated with the device 102. In one embodiment of the invention, the tag provides identification information, such as a subscriber ID or other proximity/location identifier, of the user/device transmitting the information.

More particularly, one embodiment of the invention involves reading transponders 122 (tags) based on Radio Frequency Identification (RFID) technology. RFID technology utilizes electromagnetic or electrostatic coupling in the radio frequency (RF) portion of the electromagnetic spectrum. An RFID reader system (not shown) associated with the device 102 includes at least an antenna and transceiver. An RF signal is transmitted from the RFID reader of the device 102 that activates the tags 122 when physically within a predetermined range of the tag 122. When a tag 122 has been activated, it transmits information back to the RFID reader associated with the device 102. More particularly, in the case of a passive tag (described below), the tag may be energized by a time-varying electromagnetic RF wave generated by the RFID reader. When the RF field passes through the antenna coil associated with the tag, a voltage is generated across the coil. This voltage is ultimately used to power the tag, and make possible the tag's return transmission of information (e.g., a subscriber ID) to the reader, sometimes referred to as backscattering. For example, the information may be stored via in a memory associated with the tag, which can be retrieved and transmitted when the tag is energized.

Any type of RFID tag may be used in connection with the present invention. For example, RFID tags can be either active or passive. Active tags require an internal battery and are often read/write tags. Passive tags do not require a dedicated power source, but rather obtain operating power generated from the reader. Further, tags may come in a variety of shapes and sizes, but are generally based on a custom designed silicon integrated circuit. Any transponder/tag may be used in connection with the present invention, and the tag type, size, and other characteristics depend on the particular environment, the desired transmission range, etc.

Any type of wireless or landline device 102 equipped with an RFID reader may be used in accordance with the present invention, such as a mobile phone, PDA, a notebook or laptop computer, desktop computer, or any other type of terminal represented by device 102.

Thus, in accordance with the invention, those devices 120 equipped with transponders such as RFID tags can be discovered. Where content is created and it is desired to register an association of the devices present when the content is created, the device 102 may send an RF signal and in response receive information from the tag 122 associated with the device 120. This information, such as a name or other identifying information of the user of device 120, can then be registered with the content via the registration module 100. For example, if a digital photograph is taken by a camera-equipped mobile phone 102 and it is desired to obtain a list of the people that are present and have devices/objects including an RFID tag 122, the camera-equipped mobile phone 102 can send the RF signal and receive an identifier of the user of device 120 via the tag 122.

Another representative identifier illustrated in FIG. 1 includes a short-range wireless identifier. One short-range wireless technology is Bluetooth, which is a computing and telecommunications industry specification that describes how mobile phones and other mobile terminals can interconnect with each other and with home and business phones/computers using a short-range wireless connection. A device 124, such as a mobile phone, PDA, computer, or the like may be configured to communicate information via Bluetooth or other similar short-range technology. A Bluetooth-enabled device 124 includes a Bluetooth transceiver to communicate via Bluetooth technology, each of which is allocated a unique Bluetooth device address or "Bluetooth ID" 126 which may be embedded in the device 124. Current Bluetooth standards specify a 48-bit device address, which allows for identification of the device. A Bluetooth device 124 may communicate directly with another Bluetooth device 102 (i.e., point-to-point), or may be connected to multiple devices (i.e., point-to-multipoint). A Bluetooth network including multiple Bluetooth devices is generally referred to as a Piconet.

Thus, in accordance with the invention, those Bluetooth-equipped devices 124 can be discovered. Where content is created and it is desired to register an association of the devices present when the content is created, the device 102 may communicate with the Bluetooth-equipped devices 124 to receive the Bluetooth ID 126. This information, such as a name or other identifying information of the user of device 124, can then be registered with the content via the registration module 100. For example, if a digital photograph is taken by a camera-equipped mobile phone 102 and it is desired to obtain a list of the people that are present and have Bluetooth-equipped devices/objects, the camera-equipped mobile phone 102 can obtain a Bluetooth identifier of the user of device 124, which can be used to identify the user of that device 124.

Another representative identifier illustrated in FIG. 1 includes a WLAN identifier (WLAN ID). Wireless Local Area Networking (WLAN) or generally "Wireless Networking" refers to a technology that allows computers and other network devices to have network connectivity using radio waves. For example, IEEE 802.11 technologies are representative examples of current wireless network technologies. A device 128, such as a mobile phone, PDA, computer, or the like may be configured to communicate information via a wireless network. Such a device 128 includes a wireless network adapter that includes a transceiver to communicate wirelessly with the network, such as via a wireless access point (WAP). Similar to the Bluetooth example, the device 128 is equipped with a WLAN identifier 130. Other devices 132 may be configured to operate using other wireless technologies, and are therefore equipped with other wireless IDs 134. In accordance with the invention, these devices 128, 132 can be discovered using these identifiers 130, 134. This information, such as a name or other identifying information of the user of device 128, 132, can then be registered with the content via the registration module 100. For example, if a digital photograph is taken by a camera-equipped mobile phone 102 and it is desired to obtain a list of the people that are present and have devices configured for such wireless operation, the camera-equipped mobile phone 102 can obtain the identifier 130, 134 of the user of device 128, 132, which can be used to identify the user of that device.

Other technologies could also be used in accordance with the invention, and those described above are merely examples to which the present invention is not limited thereto. For example, GPS, infrared, or other technologies may be used alternatively or in addition to any of those previously described. As a more particular example, infrared (IR) data transmission technology may be used, but in many cases may not be practical. For instance, current IR technologies used in mobile devices generally have a very short range, such as 1 meter. Further, IR is a line-of-sight technology that may be impractical for most applications. However, under the appropriate circumstances, such a technology may be suitable.

Thus, any device capable of transmitting an identifier in such manners may be used in connection with the present invention. These devices may include landline devices such as desktop computers or other communication devices coupled to the registration module 100. In one particularly useful embodiment of the invention, mobile devices are tracked and registered with the creation of content. For example, people often take their mobile devices with them wherever they go, which provides a means by which these people may be identified in accordance with the invention. Such mobile devices 136 may include, for example, mobile phones 138, PDAs 140, portable computing devices 142, or other communication devices 144. These devices include any one or more technologies such as RFID, Bluetooth, WLAN, etc, and therefore include some identifier 146 that can be used to register the device/person with the created content.

Figure 2A:
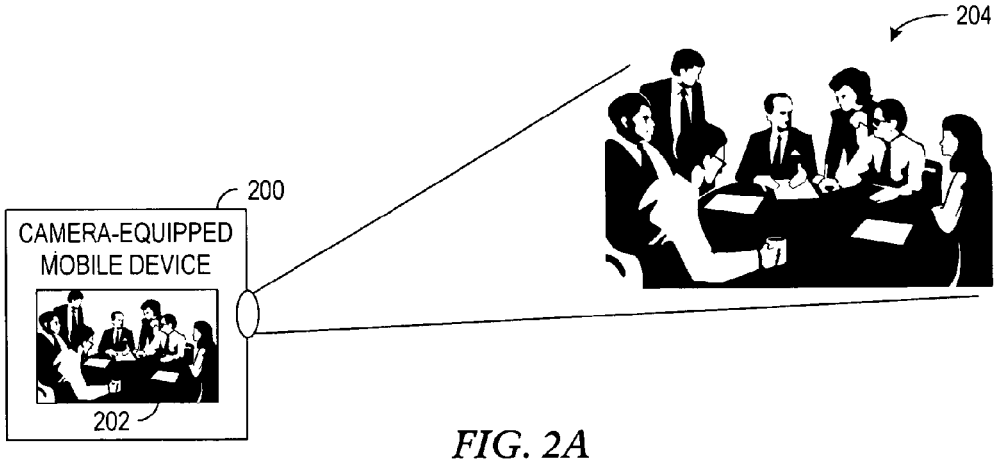
FIGS. 2A and 2B illustrate a more particular embodiment of the invention, where a camera-equipped mobile device records an image and obtains the identities of the people associated with the resulting image.
Figure 2B:
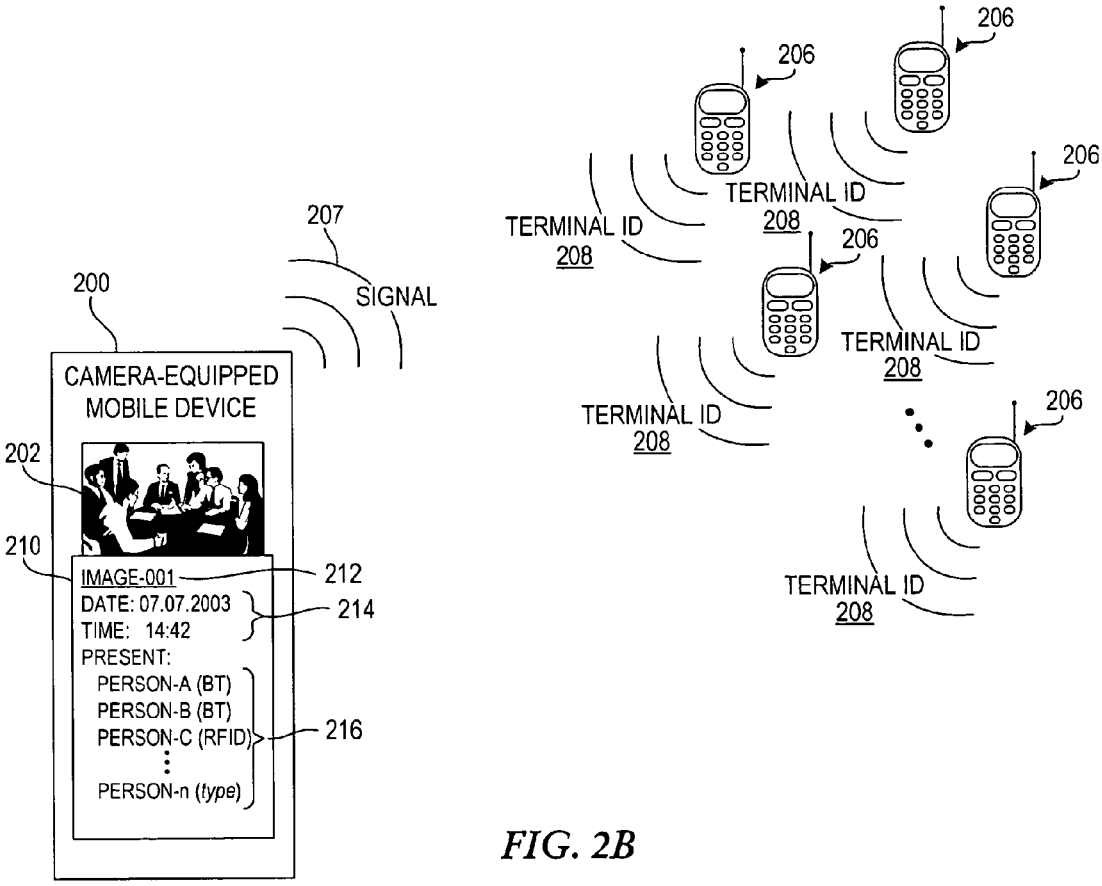

FIGS. 2A and 2B illustrate a more particular embodiment of the invention, where a camera-equipped mobile device records an image and obtains the identities of the people associated with the resulting image. As shown in FIG. 2A, the user of the camera-equipped mobile device 200 takes a digital photograph 202 of one or more entities, shown as a group of people 204 in the illustrated embodiment. In accordance with the present invention, an identification of the people present may be recorded with the digital image. In some embodiments, the identification of the people may be limited to those within the field of view of the camera, while in other embodiments others outside the field of view (including the user of the device 200) may be included.

For example, at least some, and preferably all, of the people 204 are associated with one or more proximity/location identifiers such as RFID tags, Bluetooth identifiers, WLAN identifiers, or the like. This is illustrated in FIG. 2B. The device 200 may include any one or more proximity or location technologies, including but not limited to an RFID reader, Bluetooth transceiver, WLAN transceiver, etc. The device may send one or more queries to the various devices associated with the people 204 associated with the image 202. In the illustrated embodiment, it is assumed that each of the people 204 have a mobile device with them, such as a mobile phone 206 that can communicate with the camera-equipped mobile device 200 via Bluetooth, a WLAN, or the like. In this manner, each of the devices 206 provides a terminal ID 208 that is used by the camera-equipped mobile device 200 to register the devices 206, and accordingly the people 204, that are associated with the image 202. The terminal IDs 208 may be provided in response to a query signal 207, or alternatively may be periodically/occasionally provide by the devices 206 and recognized by the camera-equipped mobile device 200.

Upon receipt of the various terminal IDs 208, a registration module 100 (see FIG. 1) creates an association between the content 202 and the list of identifiers 208. Such an association may be, for example, the filename of the content 202 that is stored at the camera-equipped mobile device 200 or elsewhere. In the illustrated embodiment, an image file 210 is created, which is associated with the content 202. The image file 210 may include a filename 212, date and time information 214, and the list of identifiers 216 obtained via the terminal IDs 208. The list of identifiers 216 may be stored as the terminal IDs 208 themselves and later converted to a list of the users associated with the terminal IDs 208, or alternatively may be first converted at the camera-equipped mobile device 200 such that the users' names are recorded as the list of identifiers 216 of the image file 210. In one embodiment, an identification of the device user is provided, as well as an indication of the type of proximity/location identifier used. For example, the information may be provided such as "Person-n (type)," where "Person-n" identifies the user/subscriber of the device, and "(type)" indicates whether the proximity/location identifier is a Bluetooth identifier, RFID, WLAN, etc.

Figure 3:
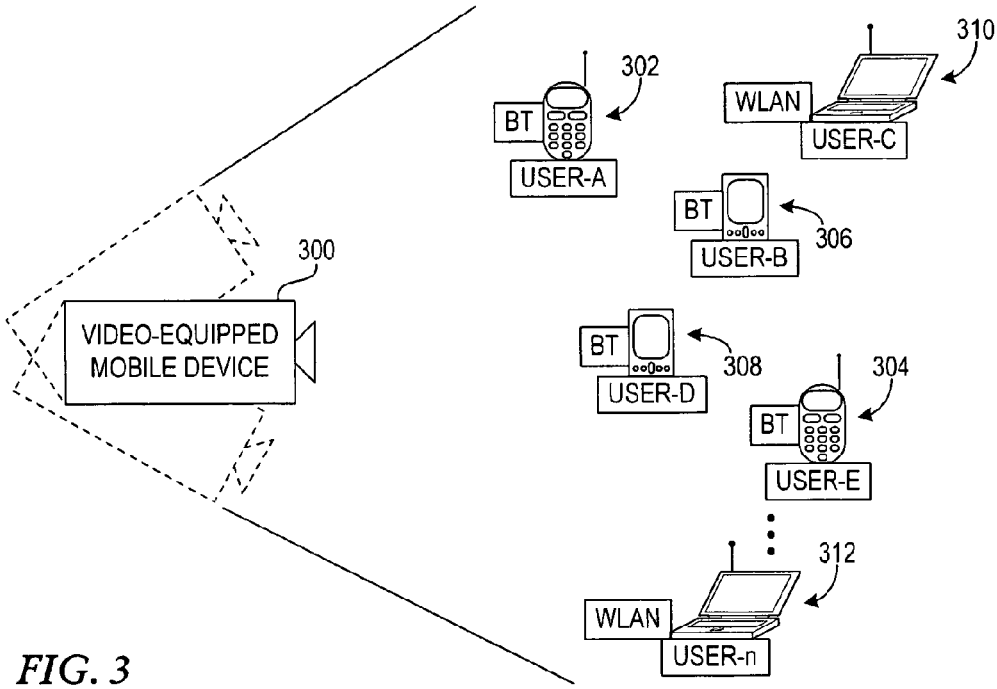
FIG. 3 illustrates an embodiment involving a video-equipped mobile device that obtains the identities of the entities associated with the resulting video.

The present invention is applicable for any number of types of content. FIG. 3 illustrates a particular embodiment of the invention, where a video-equipped mobile device records a video and obtains the identities of the entities associated with the resulting video. As shown in FIG. 3, the user of the video-equipped mobile device 300 takes a digital video of one or more entities, which are users of various mobile devices in the illustrated embodiment. In accordance with the present invention, an identification of the devices present may be recorded with the resulting video.

For example, the devices that are recorded may use any one or more proximity/location technologies. In the illustrated embodiment, User-A 302 and User-E 304 are Bluetooth-enabled mobile phone users, and User-B 306 and User-D 308 are Bluetooth-enabled PDA users. User-C 310 and User-n 312 are portable computer users coupled to a WLAN. In the illustrated embodiment, the video-equipped mobile device 300 is also a Bluetooth-enabled device that is also coupled to the WLAN. In this manner, the video-equipped mobile device 300 can collect the Bluetooth and WLAN identifiers associated with the devices, and can therefore obtain the identification of the users 302-312 to register with the created video. The present invention is applicable to audio and other media/multimedia content in an analogous manner.

Figure 4:
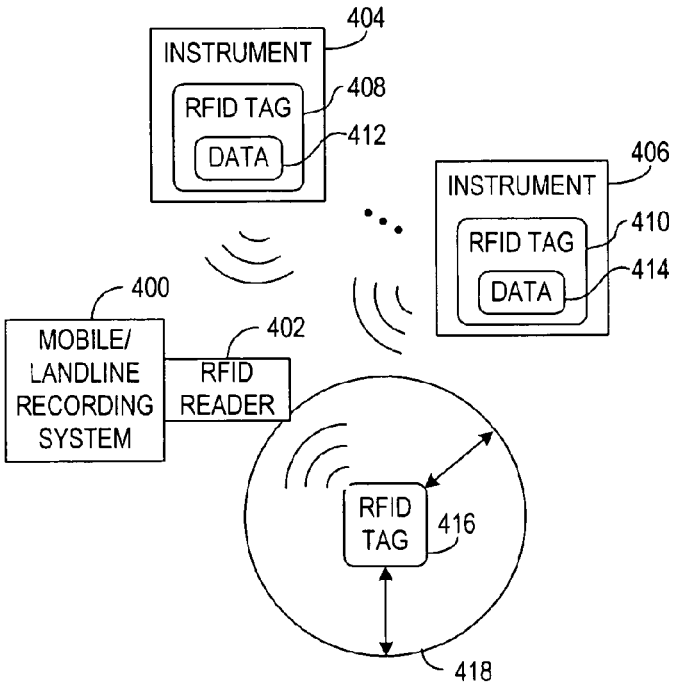
FIG. 4 illustrates a particular example where a recording system is used to determine what devices are present in connection with the creation with content.

The present invention may also be used to determine "what" was there rather than (or in addition to) "who" was there. FIG. 4 illustrates a particular example where a recording system is used to determine what devices are present in connection with the creation with some content. In the embodiment of FIG. 4, a recording system 400 includes an RFID reader 402. The recording system is capable of recording content, such as audio or other content. For purposes of example, it is assumed the various instruments 404, 406 create audio. Such instruments could be musical instruments, or could be recording instruments themselves that each record a portion of a desired collective recording, etc.

In the illustrated embodiment, the recording system 400 can record the audio (or other content) provided by the instruments 404, 406. The RFID reader 402 can send an RF signal to activate the RFID tags 408, 410 of the instruments 404, 406 respectively. Each of the RFID tags 408, 410 includes some data 412, 414 that identifies the respective instrument 404, 406. In this manner, the RFID reader 402 can collect this data 412, 414, and associate the data 412, 414 with the audio recording recorded by the recording system 400. In the context of RFID technology, the RFID reader 402 will collect all data provided by instruments having RFID tags that are within a transmission range of the RFID reader 402. For example, the RFID reader 402 will collect the data associated with instruments having an RFID tag 416 within a transmission range 418 of the RFID reader 402. The embodiment of FIG. 4 is described in terms of RFID technology, but may instead (or in addition) use other identifiers as set forth herein.

Figure 5A:
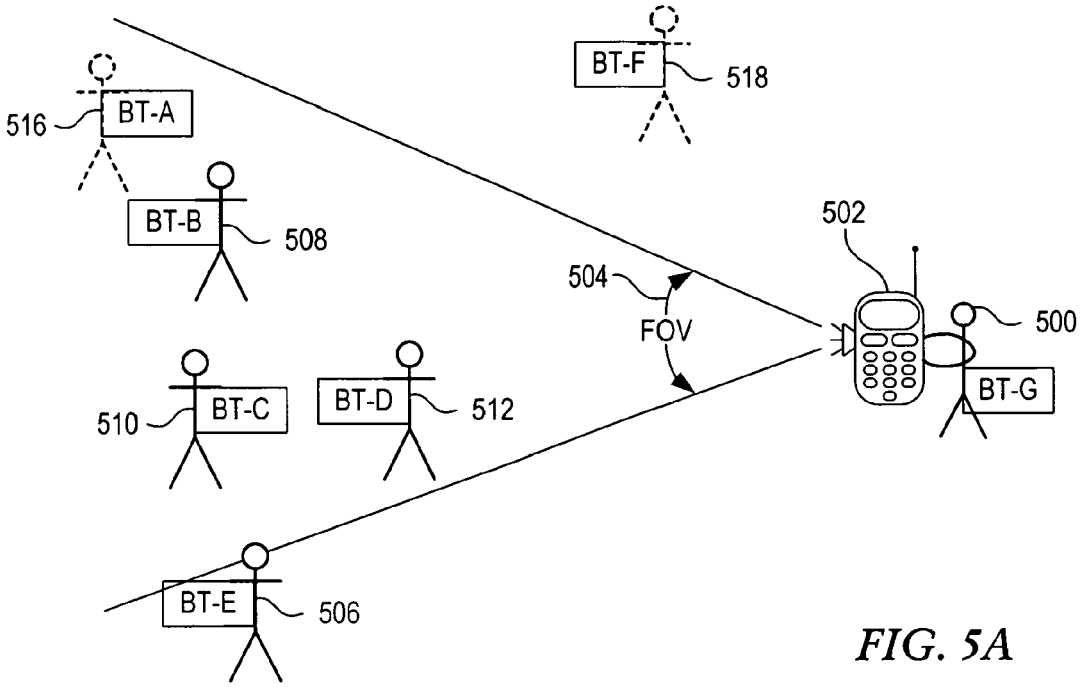
FIGS. 5A and 5B illustrate one example of filtering the list of collected identifiers in accordance with the invention.
Figure 5B:
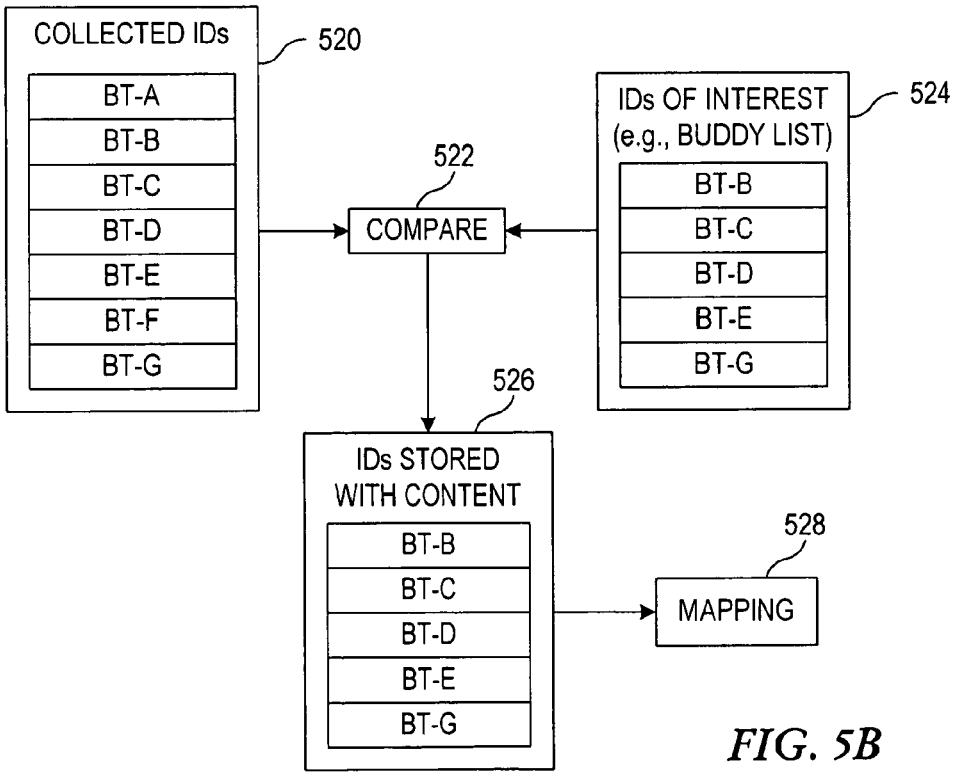

In accordance with one embodiment of the invention, the list of identifiers collected may be compared to a list of identifiers of interest. Such an embodiment is illustrated in FIGS. 5A and 5B, where the content creation is assumed to be a digital image. Referring to FIG. 5A, a first mobile device user 500 is operating a camera-equipped mobile phone 502. The user 500 takes a picture, including those entities within a field of view (FOV) 504. The user 500 may, however, only be interested in registering the information of select people within the FOV 504. For example, the user 500 may be on vacation with a group of friends, including mobile device users 506, 508, 510, 512. In such a case, the registration of users is only desired for those users among the group of friends.

For purposes of this example, it is assumed that the proximity/location technology used is Bluetooth, and each of the group of friends 506, 508, 510, 512, as well as the person 500 taking the picture, has their Bluetooth-enabled mobile device with them. However, other people in the area but not associated with the group, may also have Bluetooth-enabled devices with them. For example, mobile device users 516, 518 are not associated with the group. Bluetooth identifiers will be obtained by all users in the vicinity, whether or not associated with the group of friends. It is first noted that this collection of Bluetooth IDs is beneficial, as some of the group of friends may not be readily perceivable by the actual photograph, such as user 506 who is substantially outside of the FOV 504, and user 510 who may be blocked by user 512. However, because users 516, 518 are not among the group of friends to which registration with the created content is desired, one embodiment of the present invention allows such users to be filtered out from any ensuing registration with that content.

FIG. 5B illustrates a manner in which such filtering may be effected in accordance with one embodiment of the present invention. Each of the Bluetooth IDs in the area are collected is a list of collected Bluetooth IDs 520. The list 520 of identifiers is compared 522 against a list of identifiers of interest 524, such as a buddy list. For example, if the IDs of interest include the IDs of the group of friends, then the IDs of interest 524 includes the IDs BT-B, BT-C, BT-D, BT-E, and BT-G, from users 508, 510, 512, 506, and 500 respectively. This list 524 is compared 522 to the collected IDs 520 to filter out those collected IDs 520 that are not of interest. The resulting IDs 526 are stored with the content, i.e., the photograph in the illustrated example. As can be seen, the Bluetooth IDs BT-A and BT-F from users 516, 518, which were not among the group of friends, are not stored with the content.

In accordance with one embodiment of the invention, an association between the content and the list of identifiers is maintained. This may be, for example, the name of a file the where the content is being recorded. The resulting list 526 of identifiers may then be made available for further processing and/or storing along with the association. For example, the identifiers may be mapped 528 to MSISDNs, e-mail addresses, or the like. In one embodiment, such mapping may be based on a contact database stored in the user's 500 mobile device 502. The content can then be sent to each of the MSISDNs, e-mail addresses, etc. Further, the list of names of the people/entities may also be added or attached to the content before sending it.

The foregoing description describes embodiments where the attendance registration is terminal-based. However, the invention is applicable in other contexts, such as network/service operator-based environments. More particularly, the attendance registration may be provided as a service. For example, where content is created at a terminal, such as a mobile phone, a trigger signal may be sent to the operator who in turn uses location-based technology to determine the location of the mobile phone and other terminals in the vicinity of the mobile phone. More particularly, when the operator obtains a list of the people/entities in an area based on a device trigger signal, a list of the users in the area may be sent to the triggering device. The list may optionally be filtered at the triggering device, or by the operator and sent to the device. The operator, ISP, or the like can perform the filtering based on the unfiltered list collected by the content-generating device. In this manner, the appropriate list of users/entities may be associated with created content. Alternatively the operator/ISP may provide a service, such as taking the created content and the (optionally filtered) list, and providing the content to those recipients identified on the list.

Figure 6A:
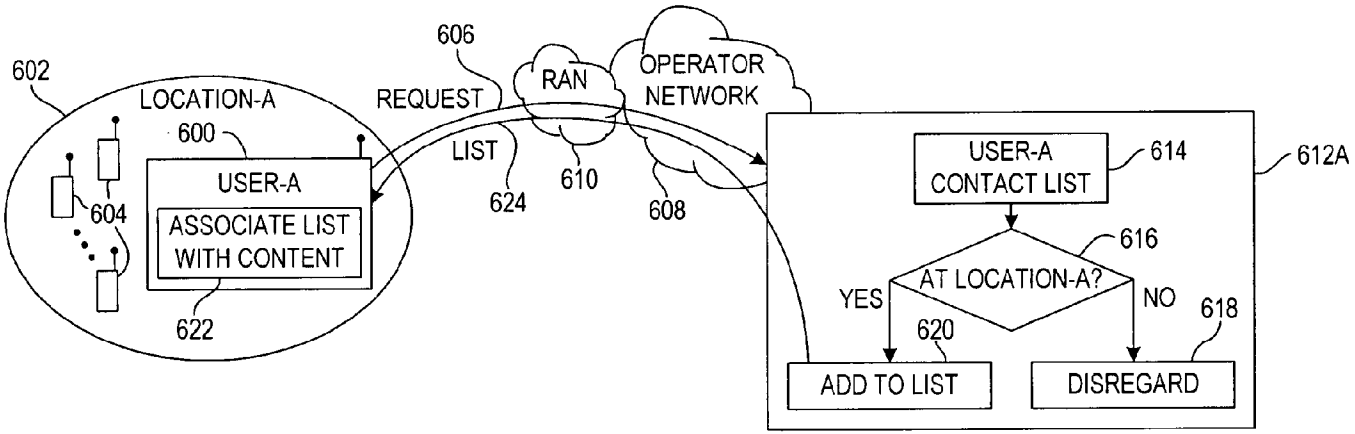
FIGS. 6A and 6B illustrate representative embodiments of providing attendance registration services via a network operator/ISP in accordance with the present invention.
Figure 6B:
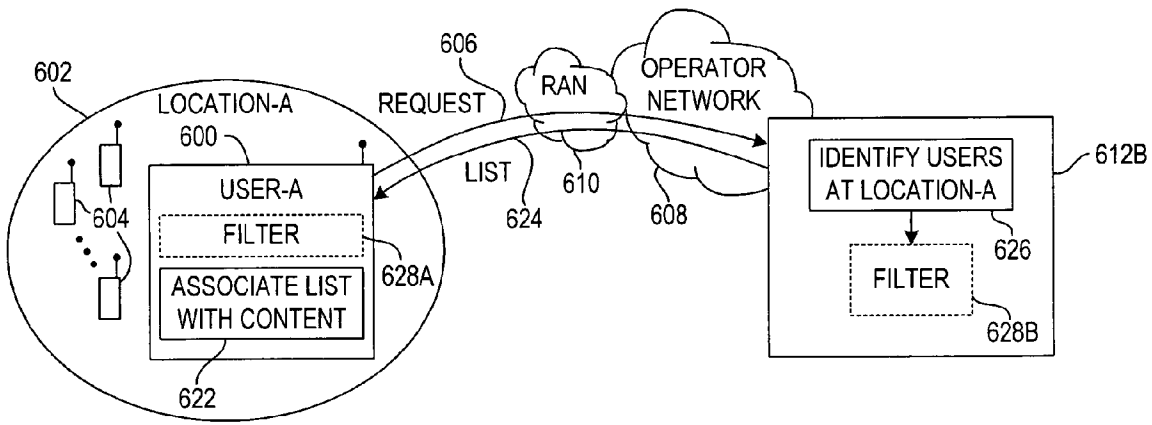

FIGS. 6A and 6B illustrate representative embodiments of providing such attendance registration services via a network operator/ISP in accordance with the present invention. In a cellular network, the mobile device can be tracked to particular locations. For example, a GSM network (as well as other cellular networks) includes a number of identifiers used to identify the various network constituents. Mobile terminals are generally associated with an equipment identifier, and the user of the mobile terminal is generally associated with a subscriber identifier (such as that provided by a Subscriber Identity Module (SIM)) as well as with an identifier such as a telephone number. In addition, several other identifiers are defined for managing subscriber mobility and addressing other network elements. Other identifiers include a cell identifier (cell-ID) and the Base Transceiver Station Identity Code (BSIC). To understand these identifiers, it is noted that cellular networks such as GSM networks include various geographic areas, including cells, Location Areas (LAs), MSC/NVLR service areas, and Public Land Mobile Network (PLMN) areas. A cell is the area generally corresponding to a Base Station (BS) radio coverage area, and is identified via the cell-ID. The LA represents a group of cells, and corresponds to the area in which subscribers are paged, where paging refers to the act of broadcasting over the setup channel in order to locate a mobile terminal. Each LA is assigned a location area identity (LAI) number. Within a particular LA, the individual cells are uniquely identified with a cell-ID. Together with the LAI, cells can be uniquely defined on an international level. Using such identifiers, cellular users can be tracked to various degrees of location specificity. Further, different or additional location technologies such as the Global Positioning System (GPS) can allow users to be tracked to more precise locations. Other location-based technologies may be used, and any such location-based technologies may be used in combination.

Referring to FIG. 6A, a mobile device user, User-A 600, creates content at some location, illustrated as Location-A 602. Other users 604 may also be at that location, where one, more or all of those users 604 are users that User-A 600 would like to be registered with the created content. User-A 600 may create content, and communicate a request 606 to an operator network 608 via a Radio Access Network (RAN) 610. The request 606 may be manually sent, or may be automatically generated in response to creation of content or some other triggering event. In one embodiment, the request 606 represents a signal triggered in response the creation of content that requests the identification of users and/or other items to be registered with the created content. In the embodiment of FIG. 6A, a list 614 of users (and/or other entities) is provided to the service, represented by network service block 612A. Such a list may be provided with the request 606. Alternatively, such a list 614 may be provided in advance. For example, a phone list, buddy list, or other contact list may be associated with a user profile for User-A 600 at the service 612A, or the service 612A may otherwise maintain a database of such user contact lists.

In any event, identification of the relevant people within the area 602 includes starting with a list 614 of the people of interest, and then determining the location of those people. For the people on the list 614 that are found not to be at location-A 602 as illustrated at decision block 616, those people will be disregarded 618. Otherwise, for those people on the list 614 that are determined 616 to be at location-A 602, they will be added 620 to a resulting list 624 of relevant people to be associated with the created content. In the illustrated embodiment, User-A's mobile device performs the association 622 of the resulting list with the content, although the association may also be made at the service 612A if the content is also provided to the service 612A.

Therefore, if the people of interest are within a defined range of the service-requesting device, those people are then associated with the created content. According to the embodiment of FIG. 6A, a mobile phone user can provide a buddy list or other contact list to the operator/ISP, take a picture (or create other content) of a number of his/her friends while at an event, and then make a request to the operator/ISP for the attendance registration service. Because the user had previously provided a contact list to the operator/ISP, the operator/ISP can determine which of those on the contact list is located near the requesting user. The resulting list includes an identification of the people/entities that are near the requesting device user, and the resulting list can then be associated with the created content.

Other manners for identifying the relevant people/entities may also be implemented. FIG. 6B illustrates an alternative example where the relevant entities within an area are identified for association with the created content. In this embodiment, the service locates or otherwise identifies 626 all active device users that are within some defined or configurable range of the requesting device, such as within location-A 602. For example, the mobile device User-A 600 can take a digital photograph at a location, and request the operator/ISP service 612B to identify the devices 604 located at that area 602. Using this list of device users in the area 602, the list can be filtered to identify those device users of interest. Such filtering 628A may be performed at the requesting mobile device, or such filtering 628B may be performed at the operator/ISP service 612B based on, for example, information previously provided by the mobile device to the service 612B. Such information may include a contact list, buddy list, or other criteria that can be used to identify the devices/people of interest to the requesting mobile phone. The final list includes an identification of the device users that are near the requesting device User-A 602, where the list can be associated 622 with the created content.

Several different manners for implementing the association of the list and the created content may be used in connection with the present invention. A first such manner involves mutual referencing, where the content includes a reference to the list of relevant identifiers, the list of relevant identifiers includes a reference to the content, or both. Such a reference may be, for example, a Uniform Resource Locator (URL) or other Uniform Resource Identifier (URI). Another manner for implementing the association may be via external referencing, where there is an external data object(s) that includes a reference to the content and to the list. Another representative manner for implementing the association involves a containment implementation. In such an embodiment, the content and the list are placed the same container, in which case the absolute or relative positions of the content and the list indicate their association. Either the list or the content itself may serve as such a container for the other as well. Such a container may be, for example, a file, session, data pipe, stream, etc.

It should be noted that the attendance registration in accordance with the invention may be triggered in response to the creation of some content, such as in response to a picture being taken, a video being filmed, an audio recording, etc. However, the registration process may also be triggered in response to other activities and/or purposes. Whatever the activity, such activity is identified so that the list can be associated therewith. For example, a mobile device user may take numerous photographs throughout the day, and the triggering activity is a date and/or time. When the identified date/time occurs, the service can be initiated, thereby associating the list of people of interest with all of the photographs. As another example, the triggering event for an audio recording may be recognition of some interference outside a predetermined interference threshold, in which case all instruments are then identified in an effort to assist in identifying the instrument(s) responsible for the interference. As can be seen, any desired triggering event may be used, as long as it is identified such that registration can occur in response to that event.

Figure 7:
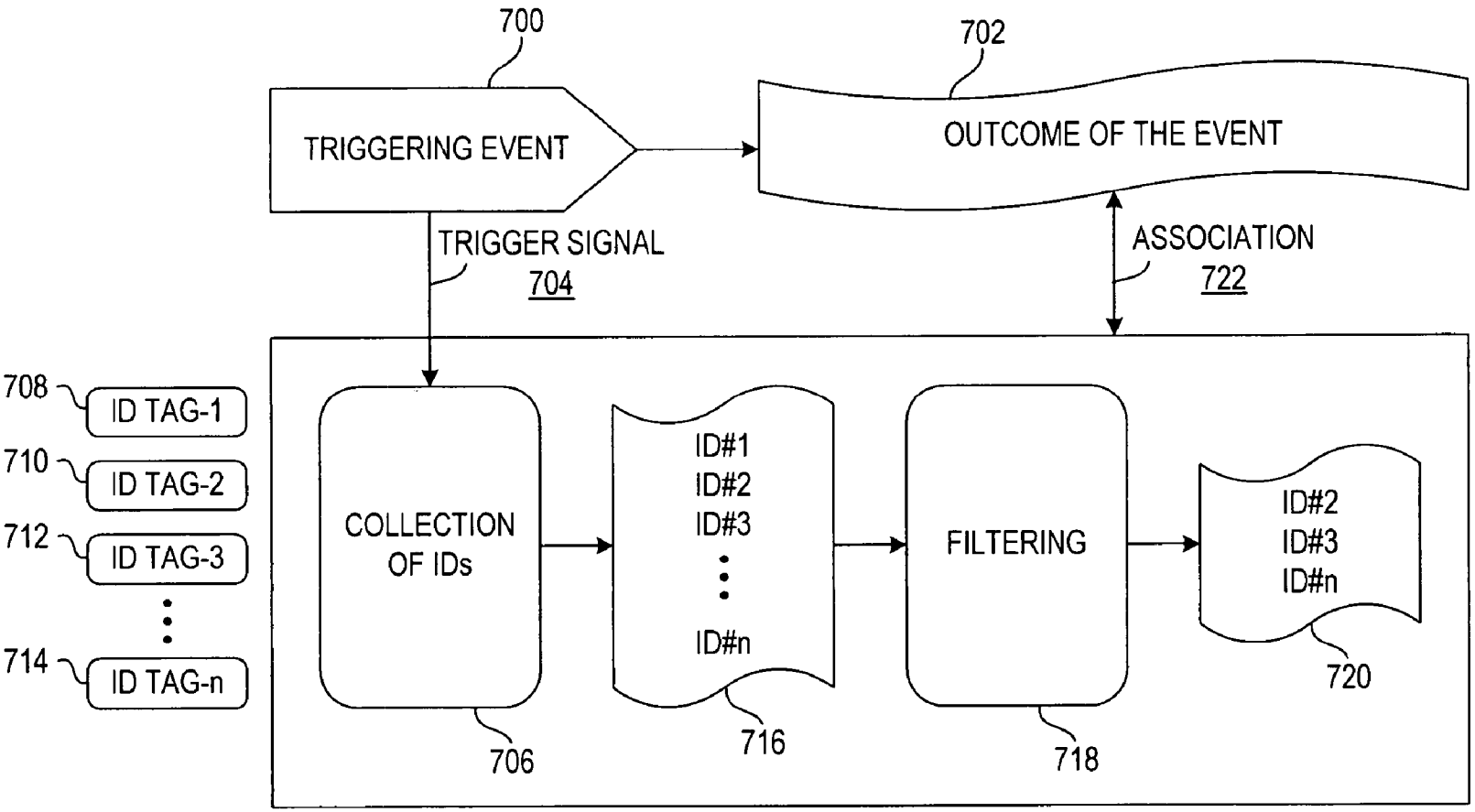
FIG. 7 is a block diagram illustrating a representative system/device architecture for providing the attendance registration functionality in accordance with the present invention.

FIG. 7 is a block diagram illustrating a representative system/device architecture for providing the attendance registration functionality in accordance with the present invention. A triggering event 700 occurs, such as the creation of content at a terminal. The event produces an outcome 702. For example, where the event is the filming of a video, the outcome of the event is the video file. The triggering event 700 may also produce a triggering signal 704 that triggers the collection of IDs 706. For example, this collection of IDs 706 may be based on proximity (e.g., RFID tags) or location (e.g., having similar coordinates). In the illustrated embodiment, these IDs are illustrated as ID tag-1 708, ID tag-2 710, ID tag-3 712, through some indeterminate number of ID tags illustrated as ID-tag-n 714. These IDs are collected 706, which results in a list 716 of the collected IDs. Filtering 718 may be performed, such as comparing the collected list 716 of IDs to a buddy list or other designation of IDs of interest. The resulting list 720 of IDs can then be associated 722 with the outcome 702 of the event.

Figure 8:
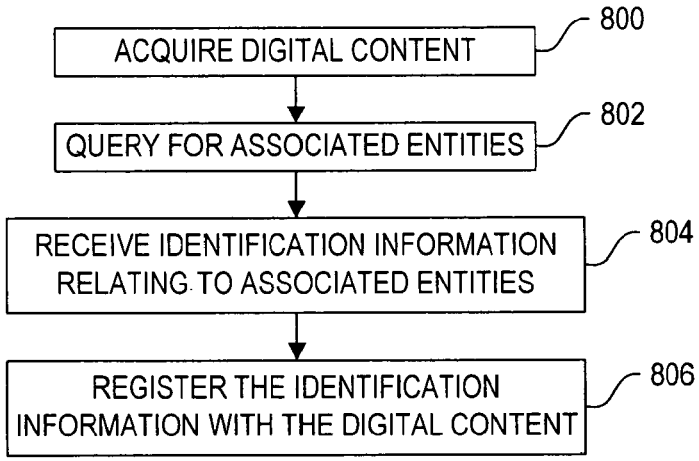
FIGS. 8 and 9 are flow diagrams illustrating representative embodiments of methods in accordance with the present invention.
Figure 9:
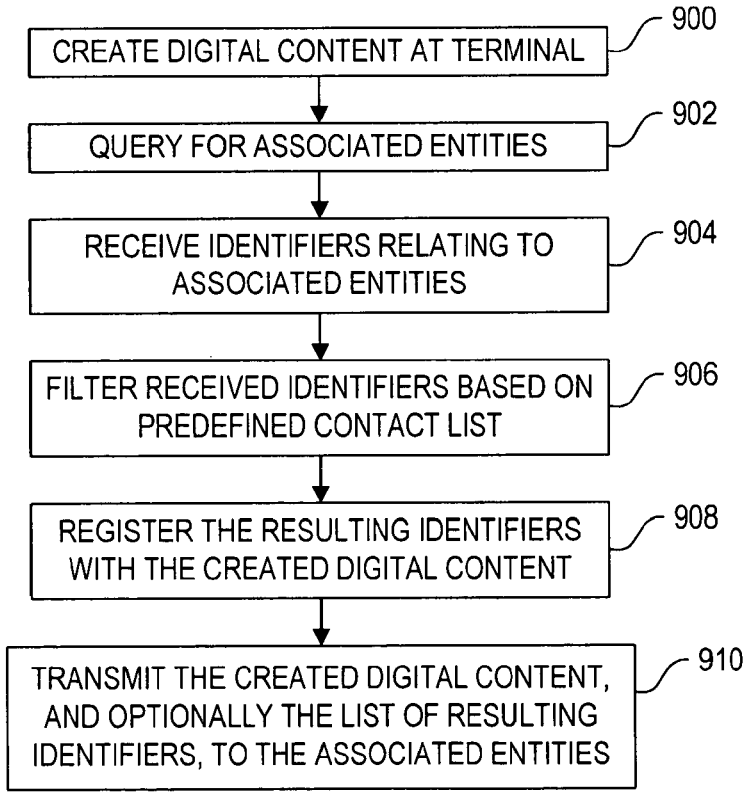

FIGS. 8 and 9 are flow diagrams illustrating representative embodiments of methods in accordance with the present invention. Referring to FIG. 8, digital content 800 is acquired. The content may be acquired by generating the content, such as by recording the content. Alternatively, the content may be acquired through duplication such as, for example, by copying or assembling existing or previously-generated content. A query 802 is made for entities that may be associated with the content, where such query may be made by using proximity and/or location technologies as previously described. Identification information relating to the associated entities is received 804, such as MSISDNs, Bluetooth IDs, WLAN IDs, user identifications provided via RFID tags, etc. The identification information is then registered 806 with the content.

FIG. 9 illustrates another embodiment of such a method, where identifier filtering and post-registration transmission of the content is performed. In the illustrated embodiment, digital content is created 900 at a terminal, such as a mobile phone, PDA, or the like. A query 902 for associated entities is performed, such as by transmitting a query signal to the entities within a certain proximity of the terminal. Identification information relating to the associated entities is received 904, and the received identifiers relating to the associated entities are filtered 906. For example, this filtering may be based on a contact list such as a buddy list or other predefined list of identifiers of interest. The resulting identifiers are registered 908 with the digital content. Therefore, the registered information may involve a subset(s) of the received identification information. For example, information may be culled, sorted, and/or classified by group, type indicator, or other desired segmentation using the appropriate filtering function. The created digital content and/or the list of resulting identifiers may then be transmitted 910 to the entities corresponding to the resulting list of identifiers.

Figure 10:
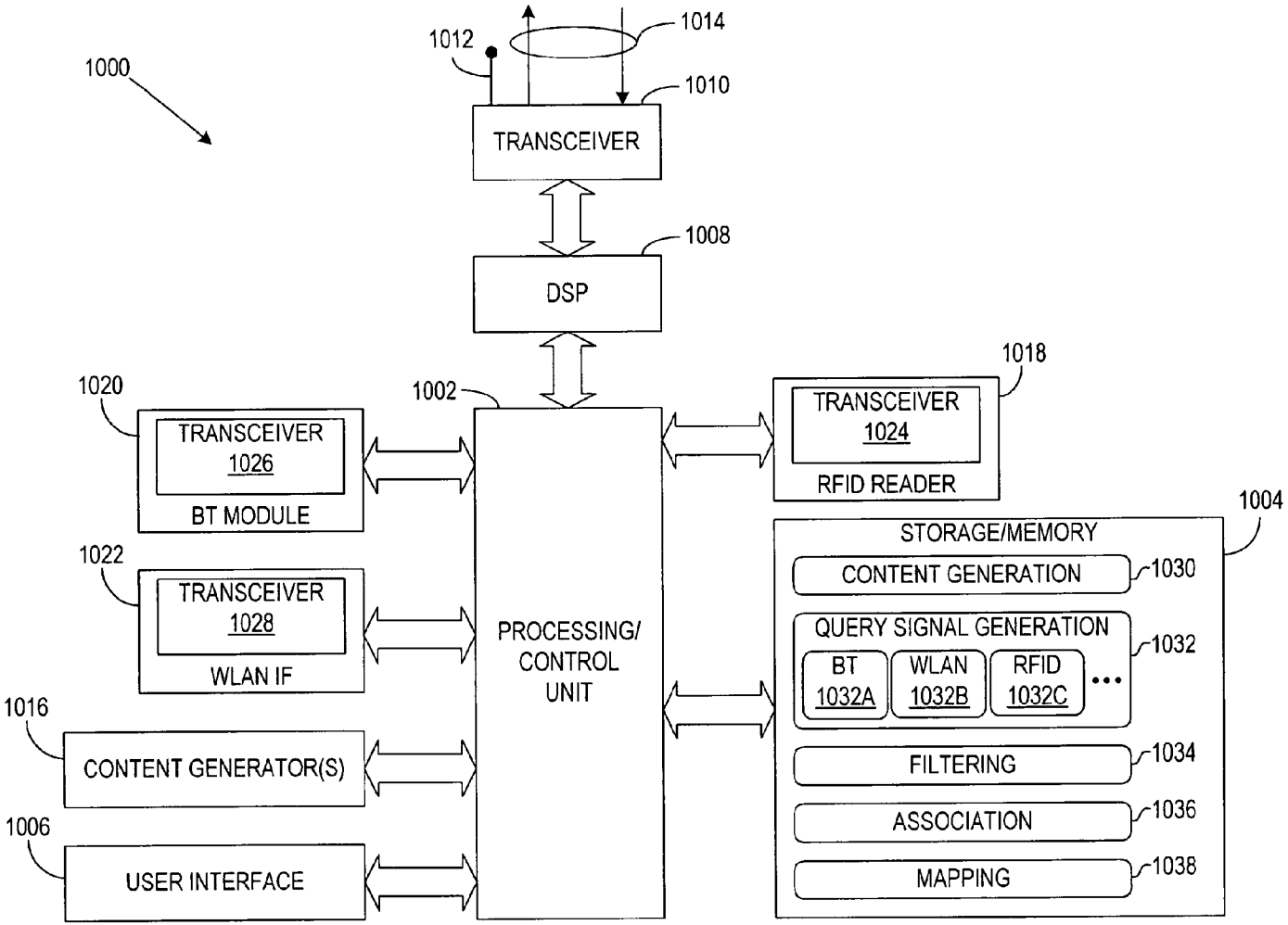
FIG. 10 illustrates a representative mobile terminal computing system capable of carrying out operations in accordance with the invention.

The terminals/mobile devices described in connection with the present invention may be implemented as any number of different devices. The present invention is particularly beneficial for use with wireless devices, such as wireless/cellular telephones, personal digital assistants (PDAs), or other wireless handsets, as well as portable computing devices capable of wireless communication. The mobile terminals utilize computing systems to control and manage the conventional device activity as well as the functionality provided by the present invention. Hardware, firmware, software or a combination thereof may be used to perform the various functions and operations described herein. An example of a representative mobile terminal computing system capable of carrying out operations in accordance with the invention is illustrated in FIG. 10.

The exemplary mobile computing arrangement 1000 suitable for performing the operations in accordance with the present invention includes a processing/control unit 1002, such as a microprocessor, reduced instruction set computer (RISC), or other central processing module. The processing unit 1002 need not be a single device, and may include one or more processors. For example, the processing unit may include a master processor and associated slave processors coupled to communicate with the master processor.

The processing unit 1002 controls the basic functions of the mobile terminal as dictated by programs available in the program storage/memory 1004. Thus, the processing unit 1002 executes the functions associated with the attendance registration aspects of the present invention. More particularly, the program storage/memory 1004 may include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The attendance registration modules associated with the present invention may also be transmitted to the mobile computing arrangement 1000 via data signals, such as being downloaded electronically via a network, such as the Internet and intermediary wireless networks.

The program storage/memory 1004 may also be used to store data, such as created content as well as identifier information provided by an RFID tag, Bluetooth device, etc. In one embodiment of the invention, the content is stored in non-volatile electrically-erasable, programmable ROM (EEPROM), flash ROM, etc. so that the content is not lost upon power down of the mobile terminal.

The processor 1002 is also coupled to user-interface 1006 elements associated with the mobile terminal. The user-interface 1006 may include, for example, a display such as a liquid crystal display, a keypad, speaker, microphone, etc. Alternatively, other user-interface mechanisms may be employed, such as voice commands, switches, touch pad/screen, graphical user interface using a pointing device, trackball, joystick, or any other user interface mechanism. These and other user-interface 1006 components are coupled to the processor 1002 as is known in the art.

The mobile computing arrangement 1000 may also include a digital signal processor (DSP) 1008. The DSP 1008 may perform a variety of functions, including analog-to-digital (A/D) conversion, digital-to-analog (D/A) conversion, speech coding/decoding, encryption/decryption, error detection and correction, bit stream translation, filtering, etc. A transceiver 1010, generally coupled to an antenna 1012, may be provided to transmit and receive cellular radio signals 1014 between the wireless device and a cellular network.

In accordance with the present invention, the mobile computing arrangement 1000 may include one or more content generation modules 1016, such as a digital camera, video recorder, audio recorder, etc. Using such devices, the user may create content using the mobile device. Furthermore, one or more wireless communication modules may be provided to obtain the identifiers from other devices/entities associated or otherwise involved in the creation of the content. Such wireless communication modules include, for example, an RFID reader 1018, Bluetooth (BT) module 1020, WLAN interface 1022, etc., each of which include a corresponding transceiver 1024, 1026, 1028 respectively.

The various content generation module 1016 and wireless communication modules 1018, 1020, 1022 operate in connection with software in one embodiment of the invention. Such software may be stored at the storage/memory 1004. For example, content generation programs 1030 may operate with the content generators 1016 to create and store content. Query signal generation software 1032, such as a BT software module 1032A, WLAN module 1032B, RFID module 1032C, may be used in connection with their respective hardware modules 1020, 1022, 1018 to initiate identifier collection functions in accordance with the invention. Other modules such as the filtering module 1034, association module 1036, and mapping module 1038 may also be provided. For example, the filtering module 1034 may be used to derive a subset (including the entire set) of identifiers of interest from all identifiers collected. The association module 1036 associates the identifiers of interest with the created content, and the mapping module 1038 may be used to map the identifiers to MSISDNs, e-mail addresses, or the like.

The mobile computing arrangement 1000 of FIG. 10 is provided as a representative example of a computing environment in which the principles of the present invention may be applied. From the description provided herein, those skilled in the art will appreciate that the present invention is equally applicable in a variety of other currently known and future mobile computing environments. For example, the various software modules in accordance with the present invention may be stored in a variety of manners, may be operable on a variety of processing devices, and may be operable in mobile devices having additional, fewer, or different supporting circuitry and user-interface mechanisms.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the invention. As such, the terms "computer-readable medium" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links.

From the description provided herein, those skilled in the art are readily able to combine software created as described with appropriate general purpose or special purpose computer hardware to create a mobile computer system and/or computer subcomponents embodying the invention, and to create a mobile computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined from the claims appended hereto.

What is claimed is:

1. A method [for registering entities associated with the creation of content,] comprising:

creating digital content via a mobile communications device capable of communicating via a wireless network;

obtaining identifiers via the mobile communications device, the identifiers corresponding to one or more entities associated with the creation of the digital content, wherein the one or more entities comprise one or more mobile terminals;

registering the identifiers of the one or more entities with the created content at the mobile communications device; and transmitting the created digital content and a list of the obtained identifiers to communication addresses of the one or more entities registered with the created digital content.

2. The method of claim 1, further comprising filtering the obtained identifiers to designate the identifiers of interest, and wherein registering the identifiers of the one or more entities with the created content comprises storing the identifiers of interest and associating the identifiers of interest with the created digital content.

3. The method of claim 2, further comprising mapping the identifiers of interest to the communication addresses of users corresponding to the one or more entities registered with the created digital content.

[4. The method of claim 3, further comprising transmitting at least the created digital content to the communication addresses of the users corresponding to the one or more entities registered with the created digital content.]

5. The method of claim 1, further comprising comparing the obtained identifiers to a list of identifiers of interest to arrive at a resulting list of identifiers, and wherein registering the identifiers of the one or more entities with the created content comprises registering the resulting list of identifiers with the created content.

6. The method of claim 1, wherein registering the identifiers of the one or more entities with the created content comprises storing the obtained identifiers, and associating the stored identifiers with the created digital content.

[7. The method of claim 6, wherein associating the stored identifiers with the created digital content comprises any one or more of including a reference to a list of the stored identifiers with the content, and including a reference to the created digital content with the list of the stored identifiers.]

[8. The method of claim 7, wherein the reference to the list of the stored identifiers comprises one of a filename and an address of the list of stored identifiers.]

[9. The method of claim 7, wherein the reference to the created digital content comprises one of a filename and an address of the created digital content as stored.]

[10. The method of claim 6, further comprising mapping the stored identifiers to the communication addresses of the one or more entities registered with the created content.]

[11. The method of claim 1, wherein registering the identifiers of the one or more entities with the created digital content comprises associating the identifiers with the created digital content, wherein associating the identifiers with the created digital content comprises providing an external data object including a reference to the created digital content and to the obtained identifiers.]

[12. The method of claim 1, wherein registering the identifiers of the one or more entities with the created digital content comprises associating the identifiers with the created digital content, wherein associating the identifiers with the created digital content comprises including the created digital content and the obtained identifiers in a common container.]

13. The method of claim 1, further comprising storing the created digital content at the mobile communications device, and wherein obtaining identifiers comprises:

transmitting at least one wireless signal from the mobile communications device to the entities within a wireless transmission range of the mobile communications device and receiving responsive wireless signals, including the identifiers, from the one or more entities within the wireless transmission range of the mobile communications device.

14. The method of claim 13, wherein the wireless signal [comprises] transmitted from the mobile communications device comprises one or more of a Radio Frequency (RF) activation signal, a Radio Frequency Identification (RFID) activation signal, a Bluetooth query signal, and a WLAN query signal.

15. The method of claim 13, further comprising transmitting the responsive wireless signals from any of a Radio Frequency (RF) transponder, Radio Frequency Identification (RFID) tag, Bluetooth-equipped device, and WLAN-coupled device, from the one or more entities in response to the wireless signal transmitted from the mobile communications device.

16. The method of claim 1, wherein obtaining identifiers comprises obtaining the identifiers in response to at least one triggering event.

17. The method of claim 16, wherein the triggering event comprises the creation of the digital content.

18. The method of claim 16, wherein the triggering event comprises the occurrence of a time-related event.

19. The method of claim 16, further comprising mapping the identifiers of interest to the communication addresses of users corresponding to the one or more entities registered with the created digital content, and transmitting at least the created digital content to the communication addresses of the users corresponding to the one or more entities registered with the created digital content.

20. The method of claim 1, wherein registering the identifiers of the one or more entities with the created content comprises deriving a user identification for each of the identifiers, and associating the derived user identifications with the created digital content.

21. The method of claim 1, wherein obtaining identifiers comprises obtaining identifiers corresponding to the one or more entities within a wireless communication proximity of the mobile communications device.

22. The method of claim 1, wherein obtaining identifiers comprises obtaining a list of the entities at a geographic area associated with the mobile communications device.

23. The method of claim 1, wherein obtaining identifiers comprises obtaining identifiers of the entities that are the subject of the created digital content.

24. A method [for registering entities associated with the creation of content,] comprising:

creating digital content at a terminal capable of communicating via a wireless network;

obtaining identifiers corresponding to one or more entities associated with the creation of the digital content, wherein the one or more entities comprise one or more mobile terminals, and wherein obtaining identifiers comprises the terminal requesting transmission of the identifiers from a network service to the terminal; and registering the identifiers of the one or more entities with the created content at the terminal.

25. The method of claim 24, further comprising:

identifying, via the network service, the entities located within a geographic area to which the terminal is located;

creating, via the network service, a list of entities of interest by filtering out the identified entities that are not among a predetermined list of entities of interest; and providing the list of entities of interest from the network service to the terminal for registration with the created content.

26. The method of claim 24, further comprising:

identifying, via the network service, the entities located within a geographic area to which the terminal is located; and providing a list of the entities located within the geographic area from the network service to the terminal.

27. The method of claim 26, further comprising creating, via the terminal, a list of entities of interest by filtering out the entities of the list of entities that are not among a predetermined list of entities of interest, and wherein registering the identifiers with the created content comprises registering the list of entities of interest with the created content.

[28. A method for registering entities associated with the creation of content, comprising:

creating digital content at a mobile device, wherein the mobile device comprises a communications terminal capable of communicating via a wireless network;

transmitting at least one query signal from the mobile device to one or more entities within a wireless transmission range of the mobile device, wherein the one or more entities comprise one or more mobile terminals;

receiving identifiers from the entities in response to the entities successfully receiving the query signal;

digitally associating the received identifiers with the digital content created at the mobile device; and transmitting the created digital content and a list of the obtained identifiers to addresses of the one or more entities associated with the created digital content.]

[29. The method of claim 28, wherein the received identifiers comprise at least one of a user identification of devices operated by respective users, and an equipment identification of the devices operated by the respective users.]

[30. The method of claim 28, further comprising filtering the received identifiers to specify identifiers of interest among the received identifiers, and wherein digitally associating the received identifiers comprises digitally associating the identifiers of interest with the digital content created at the mobile device.]

[31. The method of claim 30, wherein filtering the received identifiers comprises comparing the received identifiers with a predetermined list of identifiers of interest, and eliminating the received identifiers that are not specified in the predetermined list of identifiers of interest.]

[32. The method of claim 28, wherein:

transmitting at least one query signal comprises wirelessly transmitting a Bluetooth query signal; and receiving identifiers from the entities comprises wirelessly receiving Bluetooth identifiers from the entities successfully receiving the query signal.]

[33. The method of claim 28, wherein:

transmitting at least one query signal comprises wirelessly transmitting a wireless query signal via a Wireless Local Area Network (WLAN); and receiving identifiers from the entities comprises wirelessly receiving WLAN identifiers from the entities successfully receiving the query signal.]

[34. The method of claim 28, wherein:

transmitting at least one query signal comprises wirelessly transmitting an RF query signal; and receiving identifiers from the entities comprises wirelessly receiving identifiers from transponders associated with the entities successfully receiving the query signal.]

[35. The method of claim 28, wherein transmitting at least one query signal comprises transmitting the at least one query signal via a wireless transmission medium, and wherein receiving identifiers from the entities comprises receiving the identifiers via the wireless transmission medium.]

36. The method of claim [28]*1*, wherein creating digital content at a mobile device comprises creating any one or more of [a] *digital data, digital artist renderings,* digital image, digital video [file], digital audio [file], *digital program code,* digital [document, and] *documents,* digital multimedia [file], *or a combination thereof.*

37. A computer-readable medium having instructions stored thereon that are executable by a mobile communications device [computing system] capable of communicating via a wireless network, the instructions executable for [registering entities associated with the creation of content by] performing steps comprising:

creating and storing digital content via the mobile communications device;

initiating a collection of entity identifiers corresponding to one or more entities associated with creation of the digital content, wherein the one or more entities comprise one or more mobile terminals;

receiving the entity identifiers from the one or more entities;

registering the entity identifiers with the created content; and transmitting the created digital content and a list of the obtained identifiers to addresses of the one or more entities registered with the created digital content.

[38. The computer-readable medium as in claim 37, wherein the instructions further perform steps comprising facilitating creation of the digital content at the mobile communications device.]

39. The computer-readable medium as in claim 37, wherein the entities associated with creation of the digital content comprise the entities within a communication proximity of the mobile communications device.

40. The computer-readable medium as in claim 37, wherein the entities associated with creation of the digital content comprise the entities within a defined geographic area relative to the mobile communications device.

41. A mobile terminal comprising:

a wireless network interface capable of communicating via a wireless network;

a content generation module configured to create digital content;

a query signal generation module configured to transmit an attendance query signal;

an association module configured to receive identifiers from entities receiving the attendance query signal, wherein the one or more entities comprise one or more mobile terminals, and wherein the association module is configured to associate the received identifiers with the created digital content and transmit the created digital content and a list of the obtained identifiers to addresses of the one or more entities associated with the created digital content.

42. The mobile terminal as in claim 41, further comprising a filtering module configured to receive the identifiers from the entities receiving the attendance query signal and to identify a subset of the received identifiers that are designated in a list of entities of interest, wherein the association module is configured to associate the subset of received identifiers with the created digital content.

43. The mobile terminal as in claim 42, further comprising a mapping module configured to map the subset of received identifiers to the addresses associated with the entities of interest.

[44. The mobile terminal as in claim 41, wherein the query signal generation module comprises any one or more of a Bluetooth module, WLAN interface module, and Radio Frequency Identification (RFID) reader module.]

[45. A system for registering entities associated with the creation of content, comprising:

one or more mobile terminals capable of communicating via wireless networks, each of the terminals having means for communicating at least an identifier associated with the respective mobile terminal in response to a query signal;

a registration module comprising:

storage to store digital content that is created via at least one of the one or more mobile terminals;

a query signal generation module configured to transmit the query signal; and an association module configured to receive the identifiers from the one or more mobile terminals that receive the query signal, and to associate at least the received identifiers with the created digital content and transmit the created digital content and a list of the obtained identifiers to addresses of the one or more mobile terminals registered with the created digital content.]

[46. The system as in claim 45, further comprising a content-generating mobile device comprising a content generation module configured to create the digital content, and wherein the content-generating mobile device comprises the registration module.]

[47. The system as in claim 45, further comprising a content-generating mobile device comprising a content generation module configured to create the digital content, and wherein the registration module is further configured to associate an identifier of the content-generating mobile device with the created digital content.]

[48. The system as in claim 45, wherein the content that is created and that involves the one or more mobile devices comprises content that is created involving users of the one or more mobile terminals.]

[49. A system for registering entities associated with the creation of content, comprising:

a network service coupled to a network;

one or more first mobile devices coupled to the network and each having an identifier associated therewith;

a second mobile device coupled to the network and having an identifier associated therewith, the second mobile device comprising:

means for generating and storing content created at the second mobile device, wherein the creation of the content implicates the first and second mobile devices;

means for transferring a request to the network service to obtain the identifiers of the first mobile devices;

means for receiving a list of the identifiers of the first mobile devices; and a registration module configured to associate the received list of identifiers with the created content.]

*50. A method, comprising:*

*creating digital content at a mobile apparatus;*

*causing, at least in part, obtaining identifiers corresponding to one or more entities associated with the created digital content, the one or more entities comprising one or more mobile terminals; and*

*causing, at least in part, actions that result in transmission of the created digital content and at least some of the identifiers from the apparatus via a wireless network to addresses of the one or more entities.*

*51. A method of claim 50, further comprising:*

*associating the identifiers of the one or more entities with the created digital content.*

*52. A method of claim 51, further comprising:*

*associating the identifiers of the one or more entities with identifiers of one or more users of the one or more entities.*

*53. A method of claim 50, wherein one or more of the entities are located within proximity of the apparatus when the digital content is being created.*

*54. A method of claim 53, wherein the one or more of the entities are contacts of a user of the mobile apparatus.*

*55. A method of claim 50, further comprising at least one of:*

*filtering the identifiers to obtain identifiers of one or more of the entities based upon one or more users of the one or more entities, and*

*filtering the identifiers to obtain identifiers of one or more of the entities that are within a field of view associated with the created digital content.*

*56. A method of claim 50, wherein the obtaining of identifiers comprising querying the one or more entities using short range communication for the identifiers.*

*57. A method of claim 50, further comprising:*

*registering the identifiers of the one or more entities with the created content.*

*58. An apparatus comprising:*

*at least one processor; and*

*at least one memory including computer program code for one or more programs,*

*the at least one memory and the computer program code configured to, with the at least one processor, cause the apparatus to perform at least the following,*

*create digital content via a mobile communications device capable of communicating via a wireless network;*

*obtain identifiers via the mobile communications device, the identifiers corresponding to one or more entities associated with the creation of the digital content, wherein the one or more entities comprise one or more mobile terminals;*

*register the identifiers of the one or more entities with the created content at the mobile communications device; and*

*transmit the created digital content and a list of the obtained identifiers to communication addresses of the one or more entities registered with the created digital content.*

*59. An apparatus comprising:*

*at least one processor; and*

*at least one memory including computer program code for one or more programs,*

*the at least one memory and the computer program code configured to, with the at least one processor, cause the apparatus to perform at least the following,*

*create digital content at the apparatus;*

*cause, at least in part, obtaining identifiers corresponding to one or more entities associated with the created digital content, the one or more entities comprising one or more mobile terminals; and*

*cause, at least in part, actions that result in transmission of the created digital content and at least some of the identifiers from the apparatus via a wireless network to addresses of the one or more entities.*

* * * * *